United States Patent
Libonate et al.

(10) Patent No.: US 9,264,430 B2
(45) Date of Patent: *Feb. 16, 2016

(54) OBTAINING TARGETED SERVICES USING A UNIQUE IDENTIFICATION HEADER (UIDH)

(71) Applicant: Cellco Partnership, Basking Ridge, NJ (US)

(72) Inventors: Brian Libonate, Walnut Creek, CA (US); Paul H. Prehn, Clayton, CA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,124

(22) Filed: Sep. 8, 2014

(65) Prior Publication Data

US 2014/0380053 A1 Dec. 25, 2014

Related U.S. Application Data

(63) Continuation of application No. 13/477,539, filed on May 22, 2012, now Pat. No. 8,832,436.

(51) Int. Cl.
*H04L 29/06* (2006.01)
*H04L 12/26* (2006.01)

(52) U.S. Cl.
CPC ............ *H04L 63/0876* (2013.01); *H04L 43/16* (2013.01); *H04L 63/068* (2013.01); *H04L 63/0892* (2013.01)

(58) Field of Classification Search
USPC ......................................................... 713/168
See application file for complete search history.

(56) References Cited

U.S. PATENT DOCUMENTS

| | | | |
|---|---|---|---|
| 8,832,436 B2 | 9/2014 | Libonate et al. | |
| 2007/0061575 A1 | 3/2007 | Bennett | |
| 2008/0222613 A1* | 9/2008 | Allen et al. | 717/128 |
| 2012/0151077 A1 | 6/2012 | Finster | |
| 2012/0173379 A1* | 7/2012 | Soroca et al. | 705/26.3 |

* cited by examiner

*Primary Examiner* — Tu Nguyen

(57) ABSTRACT

A system is configured to receive, from a user device, a request for content; obtain, based on receiving the request, an identifier for a subscriber associated with the system and a key; encode the identifier and the key to create a unique identifier; store the unique identifier in the request to create a modified request; provide the modified request to a content provider identified by the request; receive, from the content provider, the content and targeted content, the targeted content being associated with the unique identifier and conforming to an attribute of the subscriber; and provide, to the user device, the content and the targeted content.

20 Claims, 11 Drawing Sheets

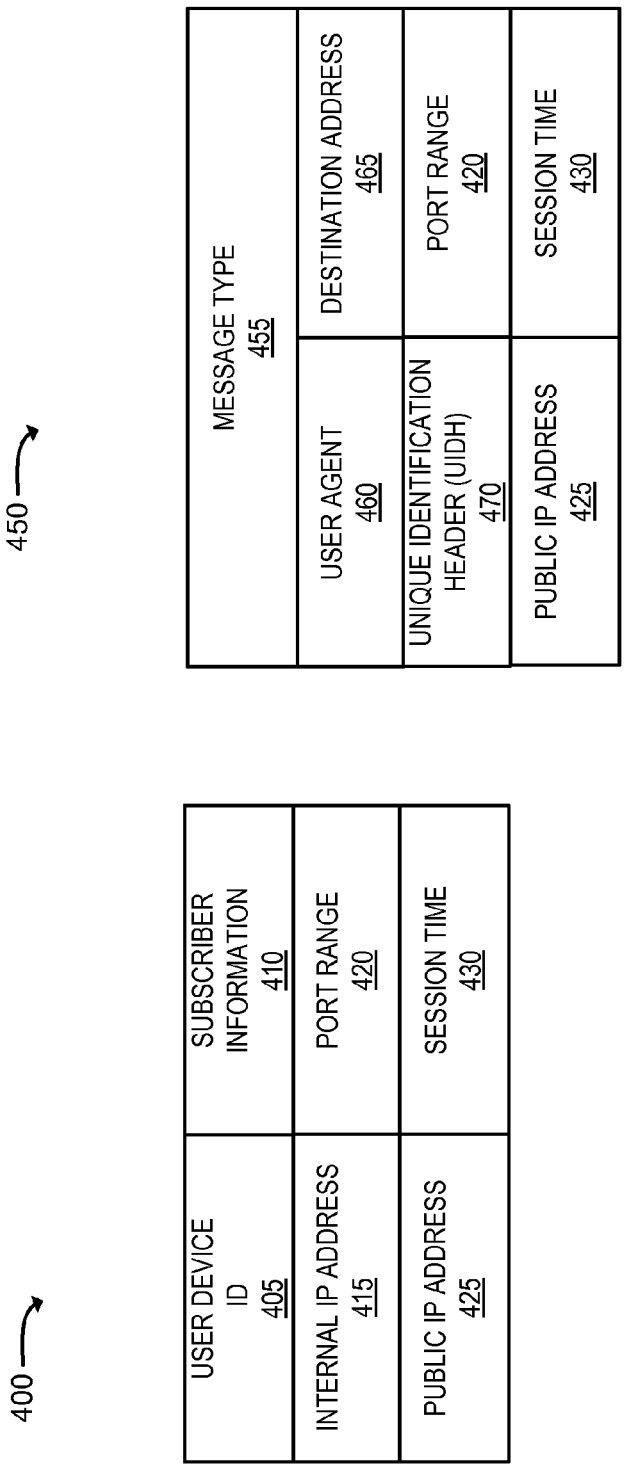

OBTAINING TARGETED SERVICES USING A UNIQUE IDENTIFICATION HEADER (UIDH)

RELATED APPLICATION

This application is a continuation of U.S. patent application Ser. No. 13/477,539, filed May 22, 2012 (now U.S. Pat. No. 8,832,436), which is incorporated herein by reference.

BACKGROUND

Service provider networks transport network traffic associated with a variety of services, applications, and content. Such networks transport more and more traffic, between user devices and content providers, which enables the services, applications, and content to be transported by the content providers and/or received by user devices. Content providers, however, may transmit services, applications, and/or content that subscribers, associated with the user devices, cannot use and/or do not desire to receive. In efforts to remedy this, the content providers may provide services, applications, and/or content that are targeted to the subscribers. The service provider networks, however, may not permit the content providers to access information, associated with the subscribers, due to security concerns, such as protecting identities of the subscribers and/or safeguarding confidential information associated with the subscribers. The content providers may, thus, not be able to provided targeted services, applications, and/or content that the subscribers can use and/or that the subscribers desire to receive.

BRIEF DESCRIPTION OF THE DRAWINGS

FIGS. 4A and 4B are diagrams of example data structures that store information associated with a network address translation (NAT) operation and/or a request for content that includes a unique identification header (UIDH), respectively;

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable a content distribution system (CDS) to provide content that is targeted (hereinafter referred to as "targeted content") to a subscriber, associated with a network, while obfuscating the identity of the subscriber. The CDS may generate a unique identification header (UIDH) by encoding an identifier associated with the subscriber and/or a key that is valid for a period of time. The CDS may also, or alternatively, identify attributes associated with the subscriber and may associate the UIDH with targeted content, (e.g., advertising content, etc.) that corresponds to the attributes. The CDS may insert the UIDH into a request for content received from a user device, being used by the subscriber, to create a modified request. The CDS may provide the modified request to a content provider. Providing the modified request to the content provider may enable the content provider to identify targeted content, associated with the UIDH, that conforms to one or more of the attributes without knowing the identity of the subscriber.

Additionally, or alternatively, the UIDH may be used, by the CDS, to provide an authentication service to a content provider. For example, the CDS may receive, from a content provider, a request to authenticate an attribute of a subscriber with which the content provider is communicating. The request may include a UIDH and a subscriber attribute to be authenticated (e.g., a subscriber identity, a billing address, payment information, etc.). The CDS may receive the request and may use the UIDH to obtain an attribute, of the subscriber, with which the UIDH is associated. The CDS may authenticate the subscriber attribute when the attribute matches the subscriber attribute obtained from the request.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
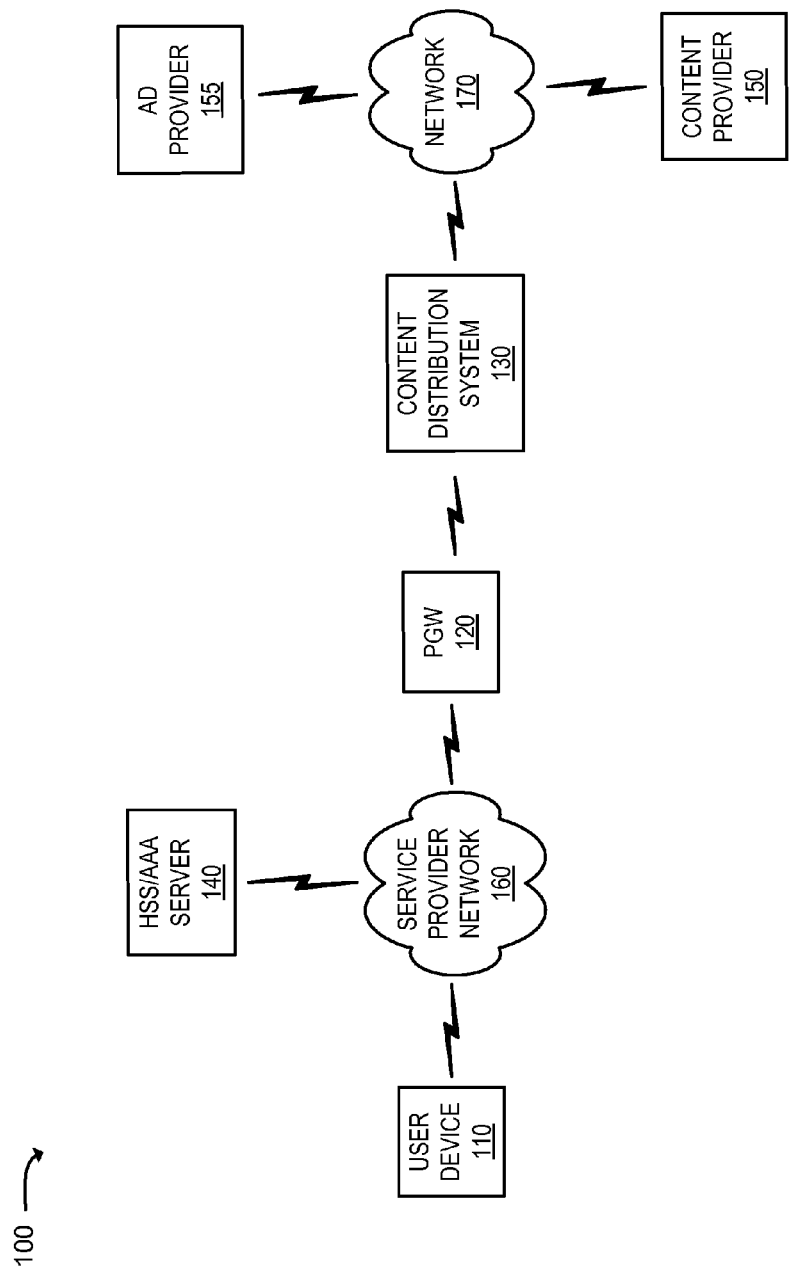
FIG. 1 is a diagram of an example environment in which systems and/or methods, described herein, may be implemented.

FIG. 1 is a diagram of an example environment 100 in which systems and/or methods, described herein, may be implemented. As shown in FIG. 1, environment 100 may include a user device 110, a packet data network (PDN) gateway (PGW) device 120 (hereinafter referred to as a "PGW 120"), a content distribution system 130 (hereinafter referred to as a "CDS 130"), a home subscriber/authentication, authorization, and accounting server 140 (hereinafter referred to as a "HSS/AAA 140"), a content provider 150, an advertising provider 155 (hereinafter referred to as "ad provider 155"), a service provider network 160, and a network 170. The number of systems, devices, and/or networks, illustrated in FIG. 1, is provided for explanatory purposes only. In practice, there may be additional systems, devices and/or networks; fewer systems, devices, and/or networks; different systems, devices, and/or networks; or differently arranged systems, devices, and/or networks than illustrated in FIG. 1.

Also, in some implementations, one or more of the devices of environment 100 may perform one or more functions described as being performed by another one or more of the devices of environment 100. Systems, devices, and/or networks of environment 100 may interconnect via wired connections, wireless connections, or a combination of wired and wireless connections.

User device 110 may include any computation and communication device that is capable of communicating via service provider network 160. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, tablet computer, a landline telephone, a set top box (STB), a television, a camera, a personal gaming system, or another type of computation and communication device. The description to follow will generally refer to user device 110 as a wireless mobile communication device. The description is not limited, however, to a wireless mobile communication device and may equally apply to other types of user devices.

PGW 120 may include one or more network devices, or other types of computation and communication devices, that gather, process, search, store, and/or provide information in a manner described herein. For example, PGW 120 may include a gateway, a router, a switch, a firewall, a network interface card (NIC), a hub, a bridge, a proxy server, an optical add-drop multiplexer (OADM), or some other type of device (e.g., a home agent (HA)) that processes and/or transfers traffic (e.g., packets). In one example implementation, PGW 120 may include a device that aggregates traffic received from one or more user devices 110, and sends the aggregated traffic to CDS 130. Alternatively, or additionally, PGW 120 may receive traffic from CDS 130 and may send the traffic toward user device 110. PGW 120 may perform a network address translation (NAT) operation, on user device 110, when a request to communicate with network 170 is received from user device 110. Additionally, or alternatively, PGW 120 may obtain, from the request, information associated with a subscriber of service provider network 160 and may communicate with HSS/AAA 140 to authenticate the subscriber based on the information associated with the subscriber. PGW 120 may generate NAT bindings as a result of the NAT operation and may transmit, as session information, information associated with NAT bindings and/or the information associated with the subscriber.

CDS 130 may include one or more computation and communication devices that gather, process, search, store, and/or provide information in a manner described herein. For example, CDS 130 may receive the request for content and/or the session information and may generate a UIDH based on the information, associated with the subscriber, obtained from the session information. CDS 130 may modify the request for content by inserting the UIDH into a packet associated with the request (e.g., into a packet header, trailer, payload, etc.). CDS 130 may transmit the modified request to content provider 150 which may enable content provider 150 to use the UIDH to provide targeted content to user device 110 being used by the subscriber with which the UIDH is associated. Additionally, or alternatively, CDS 130 may associate the UIDH with targeted content that corresponds to attributes of the subscriber. CDS 130 may also, or alternatively, provide subscriber authentication services based on a UIDH received from content provider 150. CDS 130 will be described in greater detail below with respect to FIG. 2.

HSS/AAA 140 may include one or more server devices, or other types of computation and communication devices, that gather, process, search, store, and/or provide information in a manner described herein. For example, HSS/AAA 140 may manage and/or store, in a memory associated with HSS/AAA 140, a subscriber profile of a subscriber associated with user device 110. The subscriber profile may identify services for which the subscriber has subscribed, applications used by the subscriber, a usage history, subscriber preferences, etc. The subscriber profile may also, or alternatively, identify whether the subscriber has authorized (e.g., opt in) or not authorized (e.g., opt out) some or all of the subscriber profile to be used to obtain targeted content. Additionally, or alternatively, HSS/AAA 140 may perform AAA operations when registering user device 110 with service provider network 160. Additionally, or alternatively, HSS/AAA 140 may authenticate a subscriber, associated with service provider network 160, based on information, associated with the subscriber, received from PGW 120 and/or CDS 130.

Content provider 150 may include one or more server devices, or other types of computation and communication devices, that provide any type or form of content. For example, content provider 150 may provide video, audio, images, advertising content, web pages, text, data, and/or some combination thereof. Additionally, or alternatively, content provider 150 may provide applications and/or services, such as games, scripts, messaging services, banking services, etc. Content provider 150 may communicate with a particular user device 110, being used by a subscriber of service provider network 160, to perform electronic transactions to provide a good and/or service in exchange for payment information from user device 110. Content provider 150 may receive, from ad provider 155, targeted content, such as advertising content, etc., that corresponds to a UIDH and may provide, via the particular user device 110, the targeted content and/or other content to the subscriber with which the UIDH is associated.

Ad provider 155 may include one or more server devices, or other types of computation and communication devices, that provide advertising content. Ad provider 155 may, for example, maintain targeted content, such as advertising content, etc., that corresponds to UIDHs associated with subscribers. Particular advertising content, corresponding to one or more UIDHs, may, for example, conform to attributes of the subscribers with which the UIDHs are associated. Ad provider 155 may also, or alternatively, provide advertising content, to content provider 150, that corresponds to a UIDH received from content provider 150.

Service provider network 160 may include one or more wired and/or wireless networks via which user devices 110 communicate and/or receive content. For example, service provider network 160 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, service provider network 160 may include a wide area network (WAN), a metropolitan area network (MAN), an ad hoc network, an intranet, a fiber optic-based network, and/or a combination of these or other types of networks.

Network 170 may include one or more wired and/or wireless networks. For example, network 170 may include a cellular network, the PLMN, a 2G network, a 3G network, a 4G network (e.g., a LTE network), a 5G network, and/or another network. Additionally, or alternatively, network 170 may include a WAN, a MAN, a telephone network (e.g., the Public Switched Telephone Network (PSTN)), an ad hoc network, an intranet, the Internet, a fiber optic-based network, and/or a combination of these or other types of networks.

Figure 2:
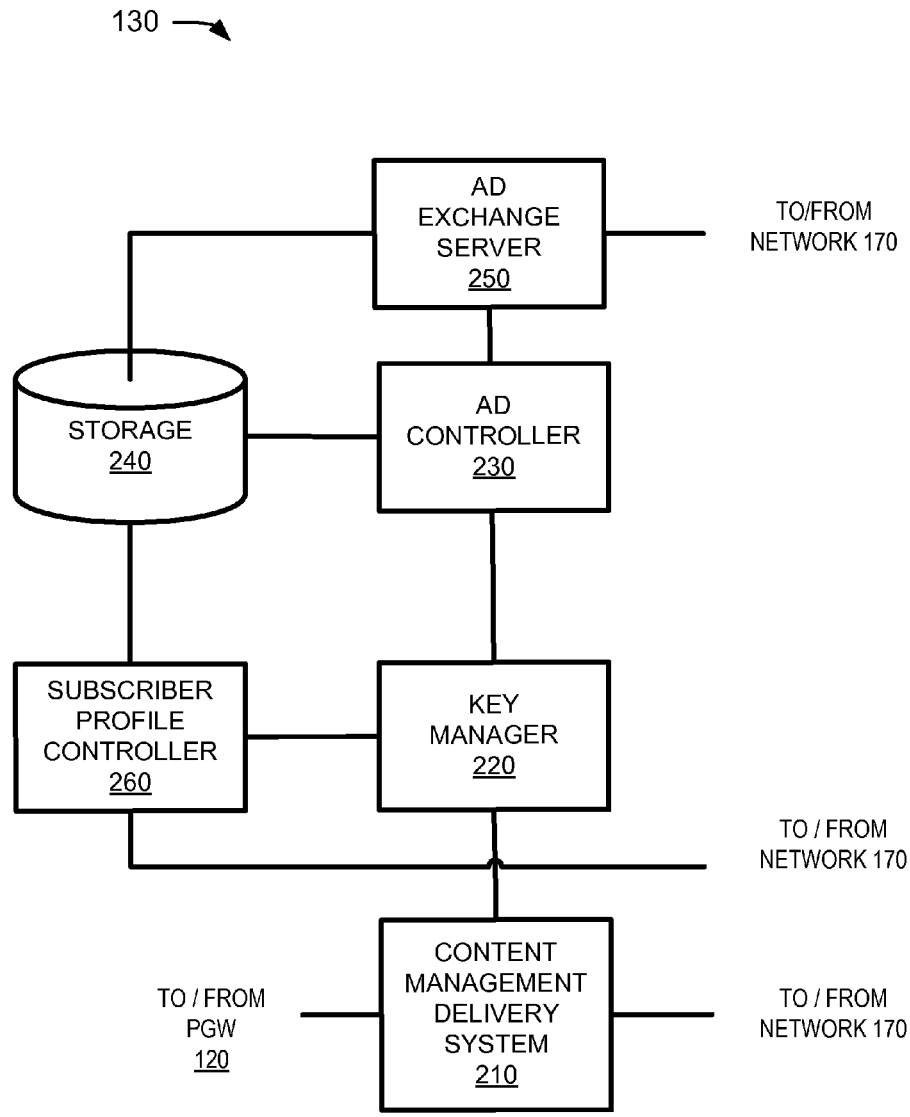
FIG. 2 is a diagram of example components of a content distribution system of the environment in FIG. 1.

FIG. 2 is a diagram of example components of CDS 130. As shown in FIG. 2, CDS 130 may include a collection of components such as a content management delivery system 210 (hereinafter referred to as "CMDS 210"), a key manager 220, an advertising controller 230 (hereinafter referred to as "ad controller 230"), storage 240, an ad exchange server 250, and a subscriber profile controller 260 (hereinafter referred to as "SPC 260"). Components 210-260 included within CDS 130 are provided for explanatory purposes only. In practice, there may be additional components, fewer components, different components, or differently arranged components than illustrated in FIG. 2.

Also, in some implementations, one or more of the components of CDS 130 may perform one or more functions described as being performed by another one or more of the components of CDS 130. Components of CDS 130 may interconnect via wired connections, wireless connections, or a combination of wired and wireless connections. Additionally, or alternatively, the components and/or devices, described below, may be implemented based on a variety of different technologies, standards, etc., such as Evolution Data Optimized (EVDO) standards, Third Generate Partnership Project (3GPP) standards (e.g., as 3G, 4G, LTE, etc. devices), fast low-latency access with seamless handoff (FLASH) standards, etc.

CMDS 210 may include one or more devices to process requests for content. For example, CMDS 210 may monitor and/or examine flows of packets (e.g., packet headers, trailers, payloads, etc.) received from PGW 120. CMDS 210 may, for example, use deep packet inspection (DPI) techniques and/or some other inspection technique to identify a request for content, received from user device 110, that is destined for content provider 110. CMDS 210 may also, or alternatively, receive session information, from user device 110, that includes information associated with NAT bindings for user device 110 and/or information associated with a subscriber to service provider network 160 that is using user device 110 to obtain the content, CMDS 210 may obtain, from the session information, an identifier associated with the subscriber (e.g., a mobile directory number (MDN) and/or some other identifier associated with the subscriber). CMDS 210 may provide a request for a key to key manager 220 and may receive the key (hereinafter referred to, in some instances, as a "salt") from key manager 220.

CMDS 210 may also, or alternatively, use a mechanism to generate the UIDH, based on the key and/or the identifier. The mechanism may, for example, correspond to a cryptographic hash function and/or some other mathematical function. Additionally, or alternatively, the mechanism may correspond to a one-way cryptographic hash function (e.g., a hash-based message authentication code (HMAC) secure hash algorithm (SHA) HMAC-SHA-256, etc.) and/or some other mathematical function. CMDS 210 may insert the UIDH into the request for content to create a modified request. CMDS 210 may also, or alternatively, transmit the modified request to content provider 150. In one example, the request may correspond to a hypertext transfer protocol (HTTP) request and CMDS 210 may insert the UIDH into a field within the HTTP request (e.g., in a header, a trailer, a payload, etc.) to create the modified request. The UIDH may be valid for a period of time during which the key is valid.

Key manager 220 may include one or more devices that generate a key to be used to generate a UIDH. For example, key manager 220 may receive, from CMDS 210, ad controller 230, and/or SPC 260, a request for a key associated with user device 110. The request may, in one example, include the identifier associated with the subscriber. Additionally, or alternatively, key manager 220 may obtain and/or generate the key that includes a string of alphanumeric characters and/or symbols. Key manager 220 may, for example, generate and/or obtain a random value and may generate the key based on the random value (e.g., using a mechanism, such as a cryptographic hash function and/or some other mathematical function, etc.). In one example, a key, may be valid for a period of time (e.g., 1 hour, 12 hours, 1 day, 3 days, 7 days, 14 days, etc.) after which the key is to expire. The period of time may be predetermined by key manager 220 and/or an operator of CDS 130 and/or key manager 220. Key manager 220 may provide the key to CMDS 210, ad controller 230, and/or SPC 260. Key manager 220 may also, or alternatively, provide a notification, to CMDS 210, ad controller 230, and/or SPC 260, when the key has expired. In one example, key manager 220 may generate the UIDH based on the identifier (e.g., the MDN, etc.) and/or the key, and may provide the UIDH to CMDS 130.

Ad controller 230 may include one or more devices that identify content that can be targeted to the subscriber. For example, ad controller 230 may obtain the UIDH and/or the identifier associated with the subscriber and may use the identifier to access HSS/AAA 140 to obtain a subscriber profile associated with a subscriber to service provider network 160. Ad controller 230 may obtain one or more attributes of the subscriber, from the subscriber profile, and may associated with attributes with the UIDH and/or the identifier. Ad controller 230 may store, in storage 240, the attributes, the UIDH, and/or the identifier. Ad controller 230 may also, or alternatively, identify criteria, associated with content, that identifies attributes, of the subscriber, to which the content is to be targeted (e.g., based on a geographical area, a gender, a genre of content, a language, a usage history, a purchase history, parental controls, etc.). Ad controller 230 may determine whether the attributes, of the subscriber, satisfy the criteria associated with the content. Ad controller 230 may associate, within storage 240, an identifier associated with the content (e.g., a content title, a content name, a content identifier, etc.) with the UIDH and/or the identifier, associated with the subscriber, when the attributes satisfy the criteria.

Storage 240 may include one or more devices that store attributes, identifiers, and/or UIDHs associated with subscribers and/or information that identifies targeted content associated with the UIDH. Storage 240 may also, or alternatively, store session information, requests for content (e.g., received from user devices 110 being used by subscribers), etc.

Ad exchange server 250 may include one or more devices that process requests, from content provider 150, for targeted content. For example, ad exchange server 250 may receive a request from content provider 150 for targeted content (e.g., targeted advertising content) associated with a UIDH included within the request. Ad exchange server 250 may retrieve, from storage 240, information associated with targeted content that corresponds to the received UIDH. Ad exchange server 250 may provide, to content provider 150, information that identifies from which ad provider 155 the targeted content can be retrieved. Additionally, or alternatively, ad exchange server 250 may instruct ad provider 155 to provide the targeted content to content provider 150.

SPC 260 may include one or more devices that process requests for subscriber authentication services. For example, SPC 260 may register content provider 150, application developers, etc. to receive subscriber authentication services in exchange for a fee and/or other value. SPC 260 may, for example, provide an application programming interface (API) (e.g., an open computing security group (OCSG) API and/or some other API) that enables content providers 150 to communicate with SPC 260 or other components associated with CDS 130.

SPC 260 may receive, from content provider 150, a request to authenticate an attribute associated with a subscriber (e.g., an identity, a MDN, a billing address, payment information, etc.). SPC 260 may obtain a UIDH from the request and may determine whether the UIDH is valid (e.g., has not expired, etc.). When the UIDH is valid, SPC 260 may also, or alternatively, perform a look up operation to identify a UIDH, stored within storage 240, that matches the received UIDH. SPC 260 may retrieve, from storage 240, an attribute associated with the stored UIDH. SPC 260 may also, or alternatively, determine whether the retrieved attribute matches an attribute obtained from the message. SPC 260 may provide, to content provider 150, a notification that the subscriber is authenticated when the retrieved attribute matches the attribute obtained from the request. SPC 260 may provide, to content provider 150, a notification that the subscriber cannot be authenticated when the retrieved attribute does not match the attribute obtained from the request.

Figure 3:
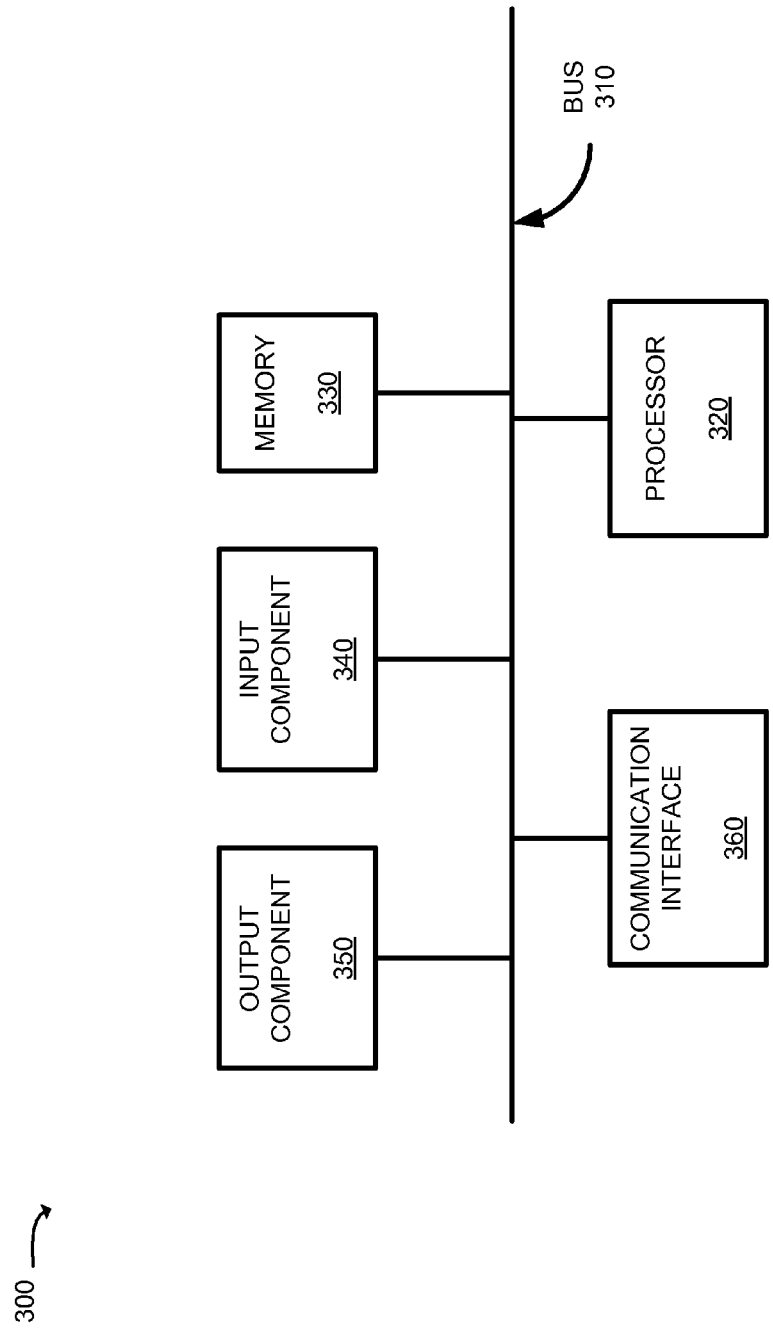
FIG. 3 is a diagram of example components of one or more of the devices of FIG. 1 and/or of the content distribution system of FIG. 2.

FIG. 3 is a diagram of example components of a device 300 that may correspond to user device 110, PGW 120, HSS/AAA 140, content provider 150, ad provider 155, CMDS 210, key manager 220, ad controller 230, ad exchange server 250, and/or SPC 260. Alternatively, each of user device 110, PGW 120, HSS/AAA 140, content provider 150, ad provider 155, CMDS 210, key manager 220, ad controller 230, ad exchange server 250, and/or SPC 260 may include one or more devices 300. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as service provider network 160 and/or network 170. In one implementation, communication interface 360 may be a logical component that includes input and output ports, input and output systems, and/or other input and output components that facilitate the transmission of data to other devices.

Device 300 may perform certain operations described herein. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 4A is a diagram of an example data structure 400 that stores information associated with a NAT operation. In one example, data structure 400 may be stored in a packet that is provided, by PGW 120, to CDS 130. As shown in FIG. 4A, data structure 400 may include a collection of fields, such as a user device identifier (ID) field 405, a subscriber information field 410, an internal Internet Protocol (IP) address field 415, a port range field 420, a public IP address field 425, and a session time field 430. Fields 405-430 within data structure 400 are provided for explanatory purposes only. In practice, data structure 400 may include additional fields, fewer fields, different fields, and/or differently arranged fields than are described with respect to data structure 400.

User device ID field 405 may store information associated with a particular user device 110. For example, the information associated with the particular user device 110 may include a device identifier (e.g., an international mobile equipment identity (IMEI), an electronic serial number (ESN), a mobile equipment identifier (MEID), etc.), an address (e.g., an Internet protocol (IP) address, a media access control (MAC) address, etc.), etc.

Subscriber information field 410 may store information associated with a subscriber to service provider network 160. The information associated with the subscriber may, for example, include subscriber identifier (e.g., a MDN, a landline director number (LDN), a subscriber identity module (SIM) uniform resource identifier (URI), a mobile identification number (MIN), an international mobile subscriber identity (IMSI), a mobile subscriber integrated services digital network (MSISDN) identifier, a national access identifier (NAI), etc.) and/or other information associated with the subscriber. The subscriber may use one or more user devices 110 to communicate with service provider network 160. In one example, the subscriber may use the particular user device 110 to communicate with service provider network 160.

Internal IP address field 415 may store an internal IP address associated with the particular user device 110. Port range field 420 may store one or more port identifiers associated with the internal IP address. Public IP address field 425 may store a unique public IP address, associated with the particular user device 110, that corresponds to a private IP address associated with the particular user device 110. Session time field 430 may store information that identifies when information, stored within data structure 400 expires.

FIG. 4B is a diagram of an example data structure 440 that stores information associated with a request for content that includes a UIDH. In one example, data structure 440 may correspond to an HTTP request that is modified, by CDS 130, based on the UIDH. As shown in FIG. 4B, data structure 450 may include a collection of fields, such as fields 420-430 of FIG. 4 as well as a message type field 455, a user agent field 460, a destination address field 465, and a unique identification header (UIDH) field 470. Fields 420-430 and fields 455-470 within data structure 450 are provided for explanatory purposes only. In practice, data structure 450 may include additional fields, fewer fields, different fields, and/or differently arranged fields than are described with respect to data structure 450.

Message type field 455 may store information that identifies a type of message. For example, message type field 455 may store information that indicates that a packet, in which data structure 450 is store, is associated with a request for content (e.g., an HTTP request). User agent field 460 may store information that identifies a type of user device 110 and/or a browser, executing on the user device 110, from which the request was sent. Destination address field 465 may store information that identifies content provider 150 from which content is being requested. For example, the information that identifies content provider 150, may correspond to a uniform resource locator (URL), or some other network address associated with content provider 150. UIDH field 470 may store a UIDH associated with a subscriber to service provider network 160. For example, the request for content, transmitted by user device 110, may be modified, by CDS 130, when a UIDH is inserted and/or stored in UIDH field 470 of data structure 450.

Figure 4C:
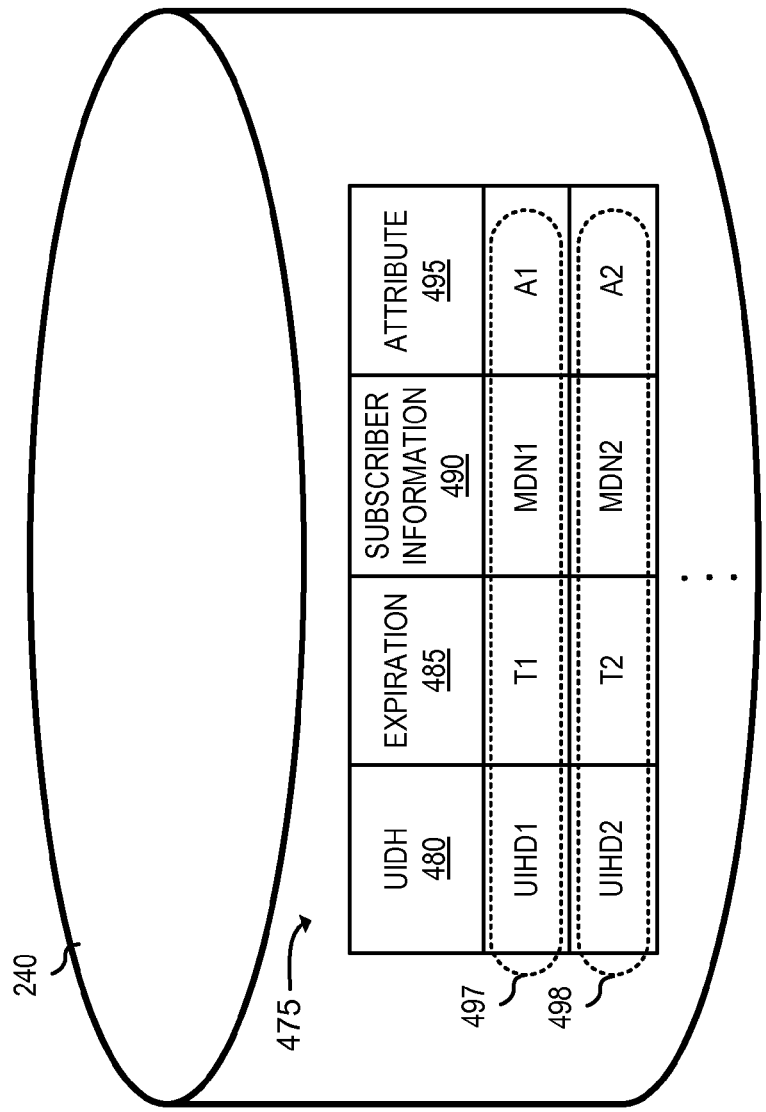
FIG. 4C is a diagram of a data structure that stores information used to provide targeted content and/or an authentication service.

FIG. 4C is a diagram of a data structure 475 that stores information used to provide targeted content and/or an authentication service. In one example, data structure 475 may be stored in storage 240. As shown in FIG. 4C, data structure 475 may include a collection of fields, such as unique identification header (UIDH) field 480, an expiration field 485, a subscriber information field 490, and an attribute field 495. Fields 480-495 within data structure 475 are provided for explanatory purposes only. In practice, data structure 475 may include additional fields, fewer fields, different fields, and/or differently arranged fields than are described with respect to data structure 475.

UIDH field 480 may store a UIDH, associated with a subscriber, that is generated by CDS 130 when processing a request for content received from a particular user device 110. Expiration field 485 may store information that identifies a time at which the UIDH expires. Subscriber information field 490 may store information associated with the subscriber (e.g., an identifier, such as a MDN, a LDN, a SIM URI, a MIN, an IMSI, a MSISDN, a NAI, etc.), obtained from the request, in a manner similar to that described above with respect to field 410 of FIG. 4A. Attribute field 495 may store one or more subscriber attributes (e.g., a geographical area, a gender, a preferred content genre, a language, a usage history, a purchase history, parental controls, etc.) of the subscriber. The subscriber attribute may, for example, be obtained by CDS 130 from a subscriber profile based on the information associated with the subscriber.

By way of example, CDS 130 may receive, from user device 110 and via PGW 120, a request for content. CDS 130 may store, in data structure 475, an identifier associated with a subscriber (e.g., MDN1) using user device 110 and a UIDH (e.g., UIDH1) that is generated based on the identifier (e.g., as shown by ellipse 497). CDS 130 may additionally, or alternatively, store information that identifies a time when the UIDH expires (e.g., T1) and one or more attributes (e.g., A1) of the subscriber (e.g., as shown by ellipse 497). Additionally, or alternatively, CDS 130 may process other requests and may store other information that is generated as a result of processing the other requests (e.g., as shown by ellipse 498). The manner in which the requests are processed, by CDS 130, will be described in greater detail below with respect to FIG. 5.

Figure 5:
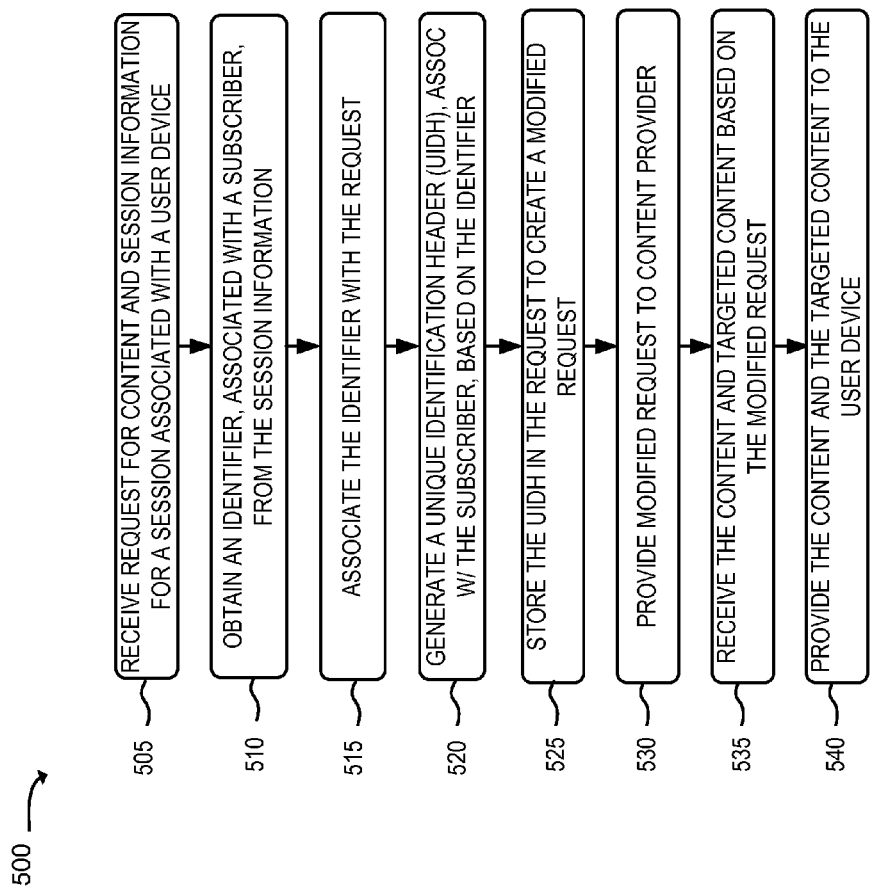
FIG. 5 is a flow chart of an example process for generating a modified request, using a UIDH, to obtain targeted content for a subscriber.
Figure 6:
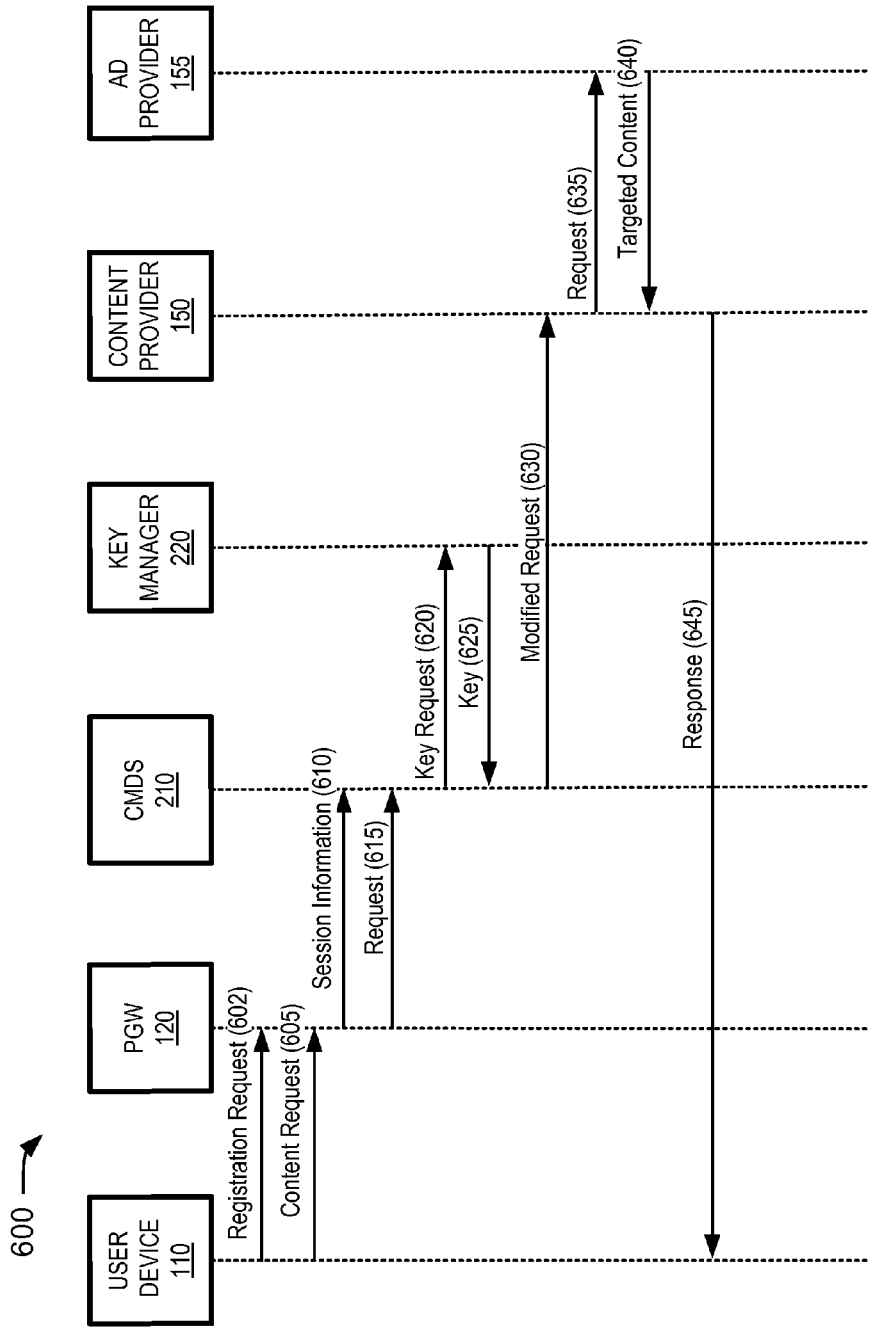
FIG. 6 is a diagram of an example signal flow between devices and/or components of an example portion of the environment of FIG. 1.

FIG. 5 is a flow chart of an example process 500 for generating a modified request, using a UIDH, to obtain targeted content for a subscriber. In one example implementation, process 500 may be performed by CDS 130. In another example implementation, some or all of process 500 may be performed by a device or collection of devices separate from, or in combination with, CDS 130. FIG. 6 is a diagram of an example signal flow between devices and/or components of an example portion 600 of environment 100. As illustrated in FIG. 6, example portion 600 may include user device 110, PGW 120, CMDS 210, key manager 220, content provider 150, and ad provider 155. User device 110, PGW 120, CMDS 210, key manager 220, content provider 150, and ad provider 155 may include the features described above in connection with one or more of FIGS. 1-3. In the description below, a portion of process 500 of FIG. 5 will be described with references to example environment portion 600 of FIG. 6.

As shown in FIG. 5, process 500 may include receiving a request for content and session information for a session associated with a user device (block 505). For example, user device 110 may send a registration request 602 (FIG. 6) to PGW 120. Registration request 602 may include a request to access a network (e.g., network 170); information associated with user device 110 (e.g., a MAC address, an ESN, MEID, IMEI, etc.); and/or information associated with a subscriber (e.g., a MDN, a LDN, a SIM URI, a MIN, an IMSI, a MSISDN, a NAI, etc.) that is using user device 110 to communicate with service provider network 160. PGW 120 may receive registration request 602 and may perform a NAT operation.

In the description below, the information, associated with user device 110, will be described as corresponding to the MDN for explanatory purposes. In other implementations, the information, associated with the subscriber, may not be so limited. For example, the information associated with the subscriber could correspond to the IMSI, SIM URI, a MIN, MSISDN, LDN, NAI, etc.

For example, PGW 120 may obtain, from registration request 602, the MDN. PGW 120 may transmit the MDN, to HSS/AAA 140, to authenticate the subscriber based on the MDN. When HSS/AAA 140 authenticates the subscriber, PGW 120 may also, or alternatively, identify an internal IP address and/or a port range to be used by a service provider network (e.g., service provider network 160). PGW 120 may create a NAT binding, associated with user device 110, by assigning the internal IP address and/or the port range to user device 110. Additionally, or alternatively, PGW 120 may associate, with the internal IP address and/or the port range, a unique public IP address to be used by a network other than the service provider network (e.g., network 170). PGW 120 may also, or alternatively, identify a time period (e.g., a lease) for which the internal IP address, the public IP address, and/or the port range is to be used. Additionally, or alternatively, PGW 120 may store, as NAT bindings and in a memory associated with PGW 120, information obtained as a result of the NAT operation. For example, the NAT bindings may include the internal IP address, the port range, the public IP address, the lease, etc. PGW 120 may transmit, to CMDS 210, session information 610 (FIG. 6). Session information 610 may include the MDN and/or the NAT bindings. In one example, session information 610 may be transmitted, to CMDS 210, in the form of a packet (sometimes referred to as a "pilot packet"). CMDS 210 may receive session information 610 from PGW 120.

Additionally, or alternatively, PGW 120 may receive, from user device 110, a content request 605 (FIG. 6). Content request 605 may, for example, correspond to a HTTP request that identifies content being requested by a subscriber of user device 110 and/or an address (e.g., a URL, etc.) associated with content provider 150 from which the content is to be obtained. Content request 605 may also, or alternatively, include a user agent field that identifies a type of user device 110 and/or an application (e.g., a web browser, etc.) being used, by user device 110, to generate and/or transmit content request 605. Additionally, or alternatively, PGW 120 may obtain (e.g., from a domain name server (DNS)) a network address (e.g., an IP address, a MAC address, etc.), associated with content provider 150, that corresponds to the URL included within content request 605. PGW 120 may provide a request 615 (FIG. 6), to CMDS 210, that includes the network address and all or a portion of the information included within content request 605. CMDS 210 may receive request 615 from PGW 120.

As also shown in FIG. 5, process 500 may include obtaining an identifier, associated with the subscriber, from the session information (block 510) and associating the identifier with the request (block 515). For example, CMDS 210 may monitor flows of traffic, received from PGW 120, by examining packets (e.g., packet headers, packet trailers, payloads, etc.) included within the flows to identify session information 610 and/or request 615. CMDS 210 may obtain, from request 615, information identifying the type of user device 110 and/or the application used to generate content request 605. CMDS 210 may determine whether a UIDH is supported by the type of user device 110 and/or the application. CMDS 210 may transmit a request for content, to content provider 150 when the UIDH is not supported by the type of user device 110 and/or the application.

Additionally, or alternatively, CMDS 210 may obtain, from the session information, information that identifies the ports and/or the MDN when the UIDH is supported by the type of user device 110 and/or the application. CMDS 210 may, based on the MDN, communicate with HSS/AAA 140 to determine whether the subscriber, associated with user device 110, authorizes the subscriber profile to be used to obtain targeted content. CMDS 210 may transmit a request for content, to content provider 150, when the subscriber does not authorize (e.g., has opted out) use of the subscriber profile. CMDS 210 may also, or alternatively, associate the information identifying the ports, the public IP address, and/or the MDN with request 615 when the subscriber authorizes use of the subscriber profile.

As further shown in FIG. 5, process 500 may include generating a UIDH, associated with the subscriber, based on the identifier (block 520). For example, CMDS 210 may provide key request 620 (FIG. 6) to key manager 220. In one example, key request 620 may include the MDN. Key manager 220 may receive key request 620 and may generate and/or obtain a random value on which a key 625 (FIG. 6) is to be based. Key manager 220 may, for example and in a manner similar to that described above with respect to FIG. 2, use a mechanism (e.g., a cryptographic hash function and/or some other mathematical function) to generate key 625 based on the random number. Key manager 220 may also, or alternatively, identify a time, at which key 625 is generated, that enables key manager 220 to determine when key 625 and/or a UIDH, that is based on key 625, expires. Key manager 220 may provide key 625 to CMDS 120.

CMDS 210 may receive key 625 and use key 625 to generate a UIDH, associated with the subscriber. Additionally or alternatively, CMDS 210 may, in a manner similar to that described above with respect to FIG. 2, use a mechanism (e.g., a cryptographic hash function and/or some other mathematical function) to generate the UIDH based on the MDN and/or key 625. The UIDH may correspond to a string of alphanumeric characters and/or symbols that is valid for a predetermined period of time (e.g., 1 hour, 12 hours, 1 day, 3 days, 7 days, 14 days, etc.) that is tracked by key manager 220. Additionally, or alternatively, key manager 220 may use the MDN and/or the key to generate the UIDH and may provide the UIDH to CMDS 210.

As yet further shown in FIG. 5, process 500 may include storing the UIDH in the request to create a modified request (block 525) and providing the modified request to a content provider (530). For example, CMDS 210 may store the UIDH in a field associated with request 615 to create a modified request 630 (FIG. 6). CMDS 210 may, for example, store the UIDH in a field associated with a header (e.g., a HTTP header) within request 615. Alternatively, CMDS 210 may store the UIDH in a trailer, a payload, and/or some other part of request 615. CMDS 210 may transmit modified request 630 to content provider 150 based on the network address associated with content provider 150, included within request 615.

As still further shown in FIG. 5, process 500 may include receiving the content and targeted content based on the modified request (block 535) and providing the content and the targeted content to the user device (block 540). For example, content provider 150 may receive modified request 630 and may obtain the content identified by modified request 630. Additionally, or alternatively, content provider 150 may obtain the UIDH from modified request 630. Content provider 150 may also, or alternatively, provide a request 635 (FIG. 6) to ad provider 155. Request 635 may, for example, include the UIDH and/or a request for targeted content associated with the UIDH.

Additionally, or alternatively, content provider 150 may provide the UIDH to ad exchange server 250. Ad exchange server 250 may, based on the UIDH, provide a notification to content provider 150 that identifies from which ad provider 155 the targeted content is to be obtained.

Ad provider 155 may receive request 635 and may determine that the UIDH, obtained from request 635, matches a UIDH that is stored in a memory associated with Ad server 155. Ad server 155 may retrieve, from the memory, targeted content 640 (FIG. 6) that corresponds to the stored UIDH and may provide targeted content 640 to content provider 150. Content provider 150 may receive targeted content 640 and may combine the content with targeted content 640 to create a response 645 (FIG. 6). Content provider 150 may transmit, as response 645, the content and/or targeted content 640 to user device 110 via CMDS 210 and/or PGW 120. User device 110 may receive response 645 and may display the content and/or targeted content 640 on user device 110.

Figure 7:
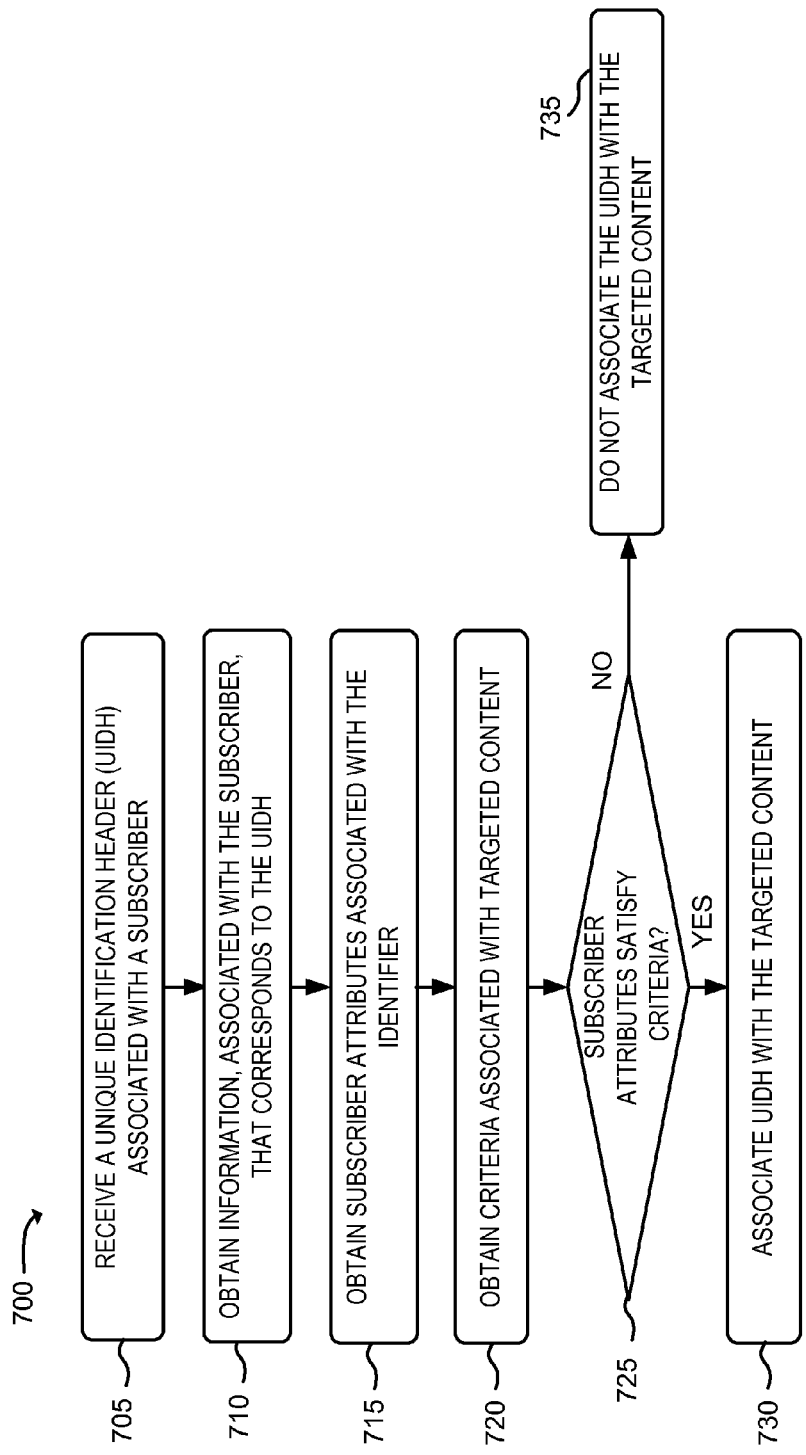
FIG. 7 is a flow chart of an example process for identifying content to be targeted to a subscriber based on a UIDH associated with the subscriber.

FIG. 7 is a flow chart of an example process 700 for identifying content to be targeted to a subscriber based on a UIDH associated with the subscriber. In one example implementation, process 700 may be performed by CDS 130. In another example implementation, some or all of process 700 may be performed by a device or collection of devices separate from, or in combination with, CDS 130.

As shown in FIG. 7, process 700 may include receiving a UIDH associated with subscriber (block 705) and obtaining information, associated with the subscriber, that corresponds to the UIDH (block 710). For example, ad controller 230 may receive a UIDH associated with subscriber. Ad controller 230 may, for example, receive the UIDH when CMDS 210 generates the UIDH when processing a request for content received from user device 110. Ad controller 230 may retrieve, from storage 240, a MDN, associated with a subscriber, that corresponds to the UIDH.

Additionally, or alternatively, ad controller 230 may receive, from CMDS 210, the MDN when CMDS 210 is processing a request, for content, received from user device 110. In this example, ad controller 230 may, in a manner similar to that described above with respect to FIG. 2, obtain a key, from key manager 230, with which to generate the UIDH.

As also shown in FIG. 7, process 700 may include obtaining subscriber attributes that correspond to the information associated with the user device (block 715) and obtaining criteria associated with targeted content (block 720). For example, ad controller 230 may identify, within storage 240, subscriber attributes that correspond to the MDN. Additionally, or alternatively, when the subscriber attributes are not stored within storage 240, ad controller 230 may communicate with HSS/AAA 140 to access a subscriber profile that corresponds to the MDN. Ad controller 230 may also, or alternatively, identify the subscriber attributes based on the subscriber profile. The subscriber attributes may, for example, identify a genre and/or a language associated with the subscriber; an address of the subscriber (e.g., a shipping address, a billing address, etc.); usage habits of the subscriber (e.g., frequently visited websites, time of the day when the subscriber accesses the Internet, etc.); a purchase history; preferred content (e.g., videos, movies, music, etc.); preferred content genres (e.g., horror, sports, country music, etc.); parental controls (e.g., exclude content with a restricted (R) rating, etc.); etc.

Additionally, or alternatively, ad controller 230 may communicate with ad provider 155 to obtain information associated with targeted content. The information associated with the targeted content may include an identifier associated with targeted content (e.g., a content name, title, identifier, etc.). The information, associated with the targeted content, may also include criteria that identifies a target audience of subscribers for which the targeted content is intended.

If the subscriber attributes satisfies the criteria (block 725—YES), process 700 may include associating the UIDH with the targeted content (block 730). For example, ad controller 230 may determine whether one or more of the attributes satisfy one or more of the criteria associated with the targeted content. Ad controller 230 may associate the UIDH with the targeted content when one or more of the attributes satisfy one or more of the criteria and may store, in storage 240, the UIDH and an identifier associated with the targeted content when the UIDH and the targeted content are associated.

Additionally, or alternatively, ad controller 230 may associate a score with the targeted content based on an extent to which the subscriber attributes satisfy the criteria. A higher score may be associated with first targeted content than second targeted content when a first quantity of satisfied criteria of the first targeted content is greater than a second quantity of satisfied criteria of the second targeted content. Ad controller 230 may store the score, in storage 240, together with the UIDH and/or the identifier associated with the targeted content. The score may enable ad controller 230 and/or ad exchange server 250 to select targeted content, associated with UIDH, with a highest score.

If the subscriber attributes do not satisfy the criteria (block 725—NO), process 700 may include not associating the UIDH with the targeted content (block 735). For example, ad controller 230 may not associate the UIDH with the targeted content when none of the attributes satisfy the criteria. Additionally, or alternatively, ad controller 230 may not associated the UIDH with the targeted content when a score, associated with the targeted content, is less than a threshold. Ad controller 230 may also, or alternatively, not store the UIDH and the identifier associated with the targeted content when the UIDH and the targeted content are not associated.

Figure 8:
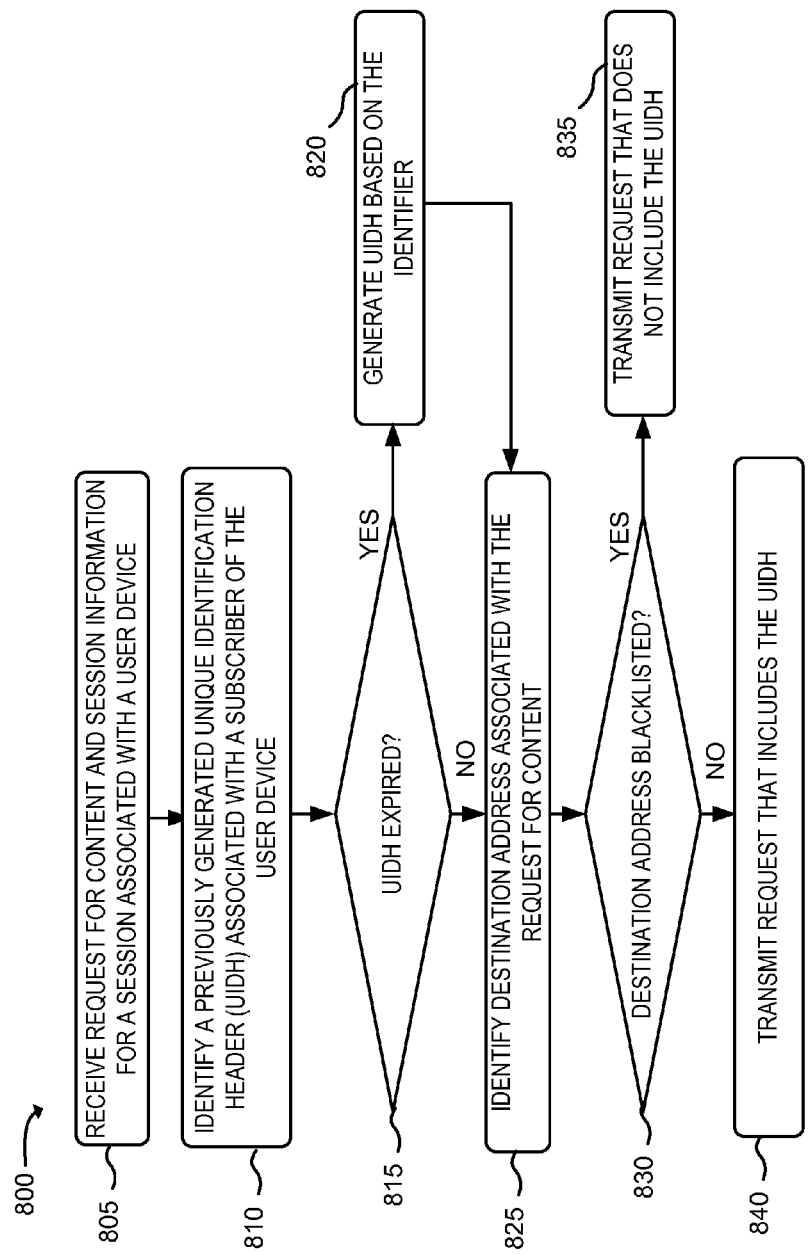
FIG. 8 is a flow chart of an example process for determining whether a previously generated UIDH, obtained from a request, can be used to provide targeted content to a subscriber.

FIG. 8 is a flow chart of an example process 800 for determining whether a previously generated UIDH, obtained from a request, can be used to provide targeted content to a subscriber. In one example implementation, process 800 may be performed by CDS 130. In another example implementation, some or all of process 800 may be performed by a device or collection of devices separate from, or in combination with, CDS 130.

As shown in FIG. 8, process 800 may include receiving a request for content and receiving session information for a session associated with a user device (block 805) and identifying a previously generated UIDH associated with a subscriber of the user device (block 810). For example, CDS 130 may, in a manner similar to that described above with respect to block 505 of FIG. 5, receive, from user device 110 and via PGW 120, a request for content. CDS 130 may also, or alternatively, receive, from PGW 120, a pilot packet that includes session information for a session associated with user device 110. CDS 130 may, in a manner similar to that described above with respect to block 510 of FIG. 5, obtain a MDN, associated with a subscriber, from the session information.

Additionally, or alternatively, CDS 130 may determine whether a previously generated UIDH is associated with the MDN. For example, CDS 130 may determine whether the received MDN matches a MDN stored in storage 240. When the received MDN matches the stored MDN, CDS 130 may retrieve, from storage 240, a UIDH that corresponds to the stored MDN.

If the UIDH has expired (block 815—YES), process 800 may include generating a UIDH based on the identifier (block 820). For example, CDS 130 may retrieve, from storage 240 and/or key manager 220, a period of time during which UIDH is valid. CDS 130 may determine that the UIDH has expired when a current time is not within the period of time associated with the UIDH. CDS 130 may also, or alternatively, use the MDN and/or a key to generate a UIDH (e.g., using a cryptographic hash function and/or some other mathematical function), associated with user device 110, in a manner similar to that described above with respect to block 520 of FIG. 5. Additionally, or alternatively, CDS 130 may generate the UIDH when CDS 130 determines that a previously generated UIDH, based on the MDN, is not stored within storage 240.

If the UIDH has not expired (block 815—NO) or after generating the UIDH based on the identifier (block 820), process 800 may include identifying a destination address associated with the request for content (block 825). For example, CDS 130 may determine that the UIDH has not expired when the current time is within the period of time associated with the UIDH. When the UIDH has not expired and/or after the UIDH has been generated, CDS 130 may obtain, from the request for content (e.g., from a header, trailer, etc.), a destination address that corresponds to content provider 150 from which the content is to be obtained.

Additionally, or alternatively, CDS 130 may retrieve, from storage 240, a list (e.g., a blacklist) of content providers 150 from which targeted content, obtained using the UIDH, is not to be received. The blacklist may include addresses (e.g., URLs, IP addresses, MAC addresses, etc.) and/or identifiers (e.g., a business name, a web site name, etc.) associated with blacklisted content providers 150. The blacklisted content providers 150 may correspond to content providers 150 that do not support the UIDH and/or have not subscribed to CDS 130 to use the UIDH.

If the destination address is blacklisted (block 830—YES), process 800 may include transmitting a request that does not include the UIDH (block 835). For example, CDS 130 may determine whether the destination address matches an address within the blacklist. When the destination address matches an address within the blacklist, CDS 130 may determine that targeted content, obtained using the UIDH, is not to be received from content provider 150, with which the destination address is associated. CDS 130 may, thus, transmit a request for the content to content provider 150 in a manner that does not include storing and/or inserting the UIDH into the request. Transmitting the request, that does not include the UIDH, to content provider 150 may enable content provider 150 to provide the content to user device 110.

If the destination address is not blacklisted (block 830—NO), process 800 may include transmitting a request that includes the UIDH (block 835). For example, CDS 130 may determine that the destination address does not match an address within the blacklist. When the destination address does not match an address within the blacklist, CDS 130 may determine that targeted content, obtained using the UIDH, is to be received from content provider 150, with which the destination address is associated. Thus, CDS 130 may, in a manner similar to that described above with respect to block 525 of FIG. 5, store the UIDH in the request to create a modified request. CDS 130 may also, or alternatively, transmit the modified request for the content to content provider 150. Transmitting the modified request, to content provider 150 may enable content provider 150 to obtain targeted content from ad provider 155 and/or to provide the content and/or the targeted content to user device 110.

Figure 9:
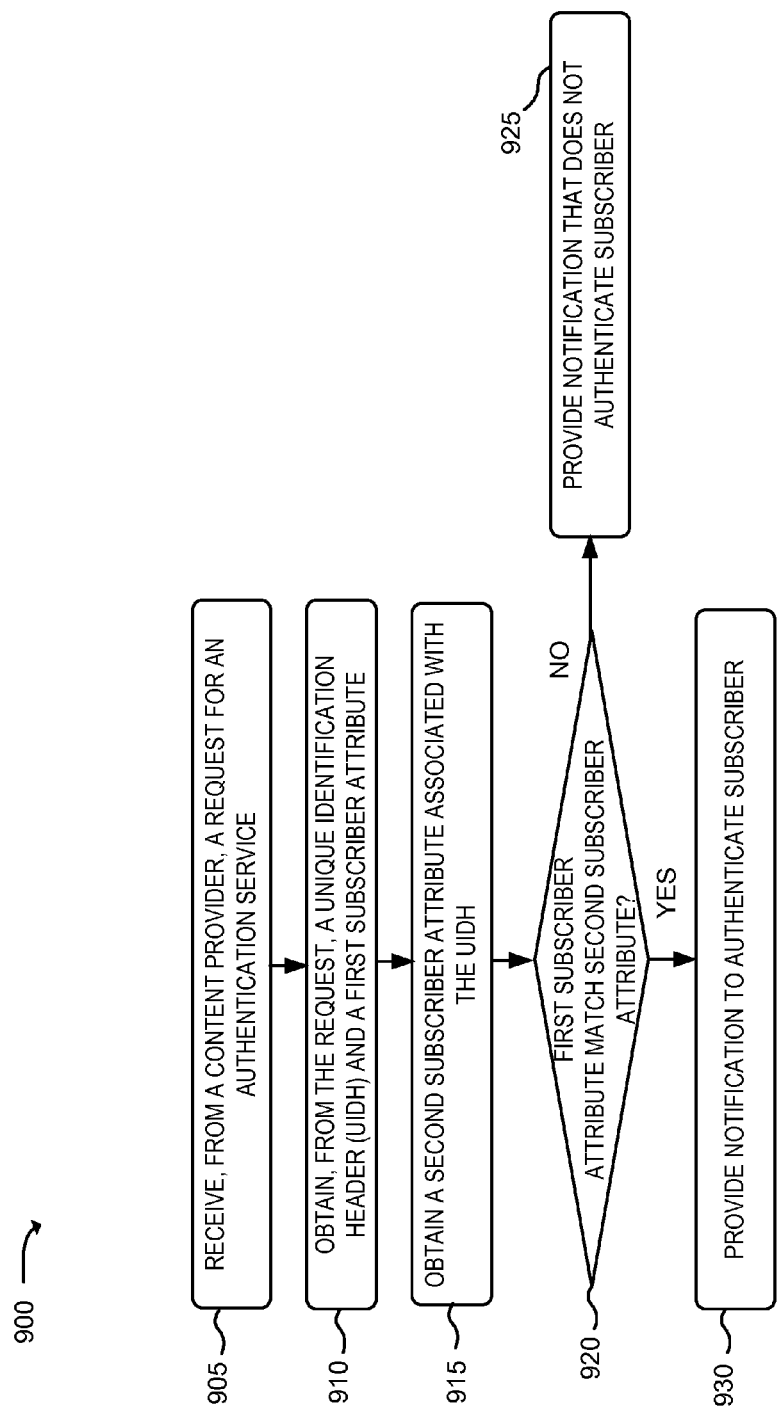
FIG. 9 is a flow chart of an example process for providing an authentication service to a content provider based on a UIDH received from the content provider.
Figure 10:
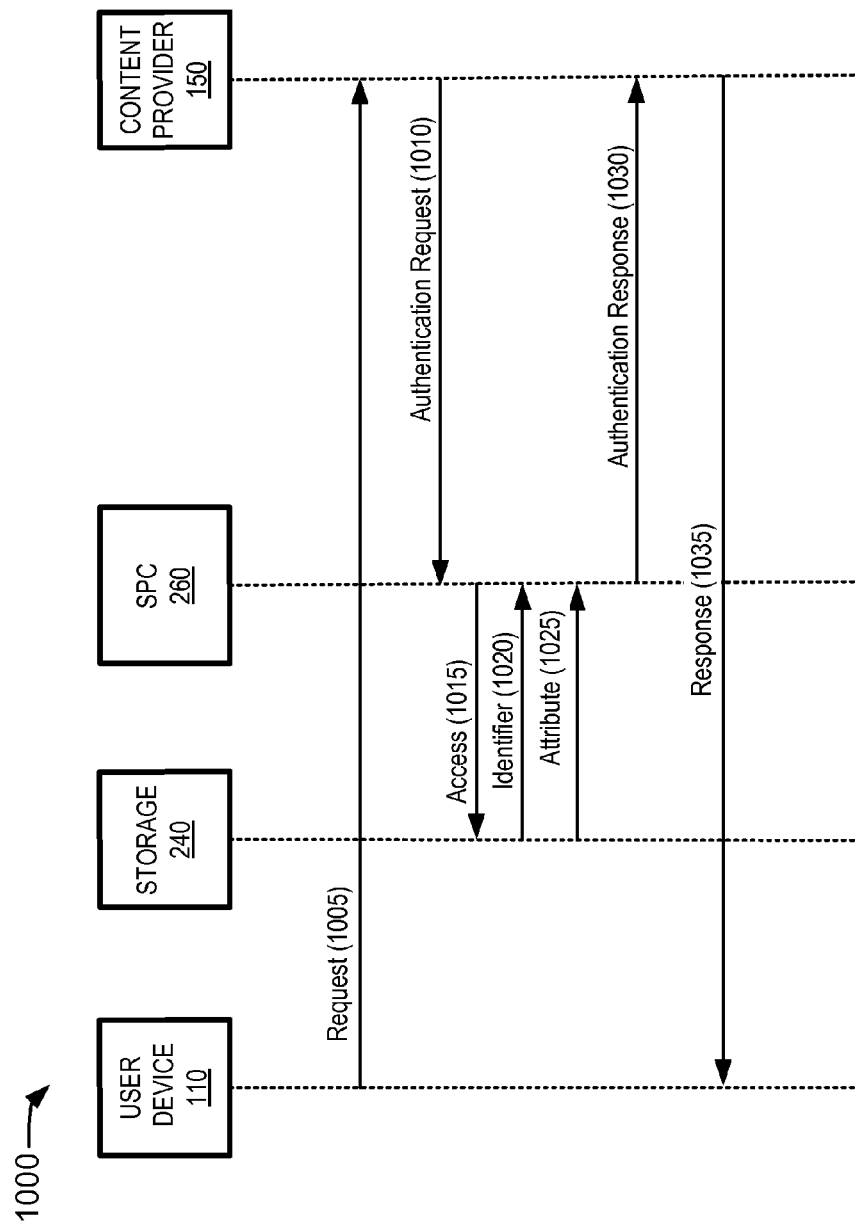
FIG. 10 is a diagram of an example signal flow between devices and/or components of another example portion of the environment of FIG. 1.

FIG. 9 is a flow chart of an example process 900 for providing an authentication service to content provider 150 based on a UIDH received from content provider 150. In one example implementation, process 900 may be performed by CDS 130. In another example implementation, some or all of process 500 may be performed by a device or collection of devices separate from, or in combination with, CDS 130. FIG. 10 is a diagram of an example signal flow between devices and/or components of another example portion 1000 of environment 100. As illustrated in FIG. 10, example environment portion 1000 may include user device 110, content provider 150, storage 240, and SPC 260. User device 110, content provider 150, storage 240, and SPC 260 may include the features described above in connection with one or more of FIGS. 1-3. In the description below, a portion of process 900 of FIG. 9 will be described with references to example environment portion 1000 of FIG. 10.

As shown in FIG. 9, process 900 may include receiving, from a content provider, a request for an authentication service (block 905). For example, user device 110 may send a request 1005 (FIG. 10) to content provider 150. Request 1005 may, in a manner similar to that described above with respect to FIG. 5, include a UIDH based on a MDN associated with a subscriber that is using user device 110 to communicate with content provider 150. Content provider 150 may receive request 1005 and may determine that one or more attributes, of the subscriber, is to be authenticated. Content provider 150 may transmit an authentication request 1010 (FIG. 10) to SPC 260. Content provider 150 may, in one example, communicate with SPC 260 via an API that enables content provider 150 to communicate with SPC 260 and/or obtain access to the authentication service. The API may be provisioned for content provider 150 based on a prior registration. SPC 260 may receive authentication request 1010 from content provider 150.

Authentication request 1010 may, for example, include the UIDH obtained from request 1005. Additionally, or alternatively, authentication request 1010 may include a first subscriber attribute that is to be authenticated, such as a subscriber identify (e.g., a subscriber name, alias, etc.), a subscriber address (e.g., a home address, business address, billing address, etc.), subscriber payment information (e.g., credit card number, expiration date, etc.), etc.

As also shown in FIG. 9, process 900 may include obtaining, from the request, a UIDH and a first subscriber attribute (block 910) and obtaining a second subscriber attribute associated with the UIDH (block 915). For example, SPC 260 may obtain the UIDH from authentication request 1010 and may, in a manner similar to that described above with respect to block 815 of FIG. 8, determine that the UIDH has not expired. SPC 260 may also, or alternatively, obtain the first subscriber attribute from the request when the UIDH has not expired.

Additionally, or alternatively, SPC 260 may perform a lookup operation to obtain an identifier 1020 (FIG. 10), with which the UIDH is associated. For example, SPC 260 may access 1015 (FIG. 10) storage 240 to identify a UIDH that matches the UIDH obtained from authentication request 1010. When the UIDH matches the stored UIDH, SPC 260 may also, or alternatively, identify a MDN that corresponds to the stored UIDH that is stored within storage 260. SPC 260 may retrieve the MDN, as identifier 1020 (FIG. 10), from storage 240. SPC 260 may also, or alternatively, identify a second subscriber attribute, stored within storage 240, that corresponds to the MDN and may retrieve the second subscriber attribute, as attribute 1025 (FIG. 10), from storage 240.

Additionally, or alternatively, SPC 260 may communicate with HSS/AAA 140 to access a subscriber profile associated with the MDN. SPC 260 may also, or alternatively, obtain the second subscriber attribute from the subscriber profile.

If the first subscriber attribute does not match the second subscriber attribute (block 920—NO), process 900 may include providing a notification that the subscriber attribute cannot be authenticated (block 925). For example, SPC 260 may compare the first subscriber attribute to the second subscriber attribute to determine whether the first subscriber attribute matches the second subscriber attribute. When the first subscriber attribute does not match the second subscriber attribute, SPC 260 may transmit an authentication response 1030 (FIG. 10), to content provider 150, indicating the first subscriber attribute cannot be authenticated. Content provider 150 may receive authentication response 1030 and may transmit, to user device 110, a response 1035 (FIG. 10) indicating that request 1005 cannot be processed when the first subscriber attribute cannot be authenticated.

If the first subscriber attribute matches the second subscriber attribute (block 920—YES), process 900 may include providing a notification that the subscriber attribute is authenticated (block 930). For example, SPC 260 may determine that the first subscriber attribute matches the second subscriber attribute. When the first subscriber attribute matches the second subscriber attribute, SPC 260 may transmit authentication response 1030 (FIG. 10), to content provider 150, indicating the first subscriber attribute is authenticated. Content provider 150 may receive authentication response 1030 and may transmit, to user device 110, response 1035 (FIG. 10) indicating that request 1005 can be processed when the first subscriber attribute is authenticated.

Systems and/or methods, described herein, may enable a CDS to generate a UIDH that can be used to provide targeted content to a subscriber while obfuscating the identity of the subscriber. The CDS may provide a modified request, that includes the UIDH, to a content provider to enable the content provider to identify targeted content, using the UIDH, without knowing the identity of the subscriber. Additionally, or alternatively, the UIDH may be used, by the CDS, to provide an authentication service to a content provider. The CDS may receive an authentication request that includes an attribute and the UIDH. CDS may authenticate the subscriber when a subscriber attribute, associated with the UIDH, matches the attribute obtained from the request.

The foregoing description provides illustration and description, but is not intended to be exhaustive or to limit the implementations to the precise form disclosed. Modifications and variations are possible in light of the above implementations or may be acquired from practice of the embodiments.

While series of blocks have been described with regard to FIGS. 5 and 7-9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and/or methods were described without reference to the specific software code—it being understood that software and control hardware can be designed to implement the systems and/or methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    obtaining, by a content distribution system, session information associated with a session via which a request for content is received from a user device,
        the session information identifying a first identifier associated with the user device;
    generating, by the content distribution system, a second identifier based on the first identifier and a key;
    inserting, by the content distribution system, the second identifier into the request; 0
    providing, by the content distribution system, the request, including the second identifier, to a content provider to obtain targeted content from the content provider,
        the targeted content being associated with the second identifier and conforming to an attribute associated with the user device; and
    providing, by the content distribution system, the targeted content to the user device.

2. The method of claim 1, further comprising:
    determining that a subscriber, associated with the user device, authorizes a use of a subscriber profile to obtain the targeted content; and
    where generating the second identifier includes:
        generating the second identifier based on the subscriber authorizing the user of the subscriber profile to obtain the targeted content.

3. The method of claim 1, further comprising:
    generating the key based on a random number.

4. The method of claim 1, where obtaining the session information includes:
    monitoring flows of traffic received from a gateway device, and
    obtaining the session information based on monitoring the flows of traffic.

5. The method of claim 1, where obtaining the session information includes:
    receiving the session information from a gateway device.

6. The method of claim 1, further comprising:
    determining, based on the request for content, at least one of:
        a type of user device associated with the user device, or
        an application used to generate the request for content; and
    determining that the second identifier is supported by the at least one of the type of user device or the application.

7. The method of claim 1, where generating the second identifier includes:
    using a cryptographic hash function to generate the second identifier based on the first identifier and the key.

8. A device comprising:
    one or more processors to:
        obtain session information associated with a session via which a request for content is received from a user device,
            the session information identifying a first identifier associated with the user device;
        generate a second identifier based on the first identifier and a key;
        modify the request by inserting the second identifier into the request;
        provide the modified request to a content provider to obtain targeted content from the content provider,
            the targeted content being associated with the second identifier and conforming to an attribute associated with the user device; and
        provide the targeted content to the user device.

9. The device of claim 8, where, when generating the second identifier, the one or more processors are to:
    obtain a random value, and
    generate the key based on the random value.

10. The device of claim 8, where, when generating the second identifier, the one or more processors are to:
    utilize a one-way cryptographic hash function to generate the second identifier.

11. The device of claim 10, where the one-way cryptographic hash function includes a hash-based message authentication code secure hash algorithm.

12. The device of claim 8, where the request for content includes a hypertext transfer protocol (HTTP) request, and
where, when modifying the request, the one or more processors are to:
modify the HTTP request by inserting the second identifier into a field within the HTTP request.

13. The device of claim 8, where the session information comprises first session information and the request for content comprises a first request for content, and
where the one or more processors are further to:
obtain second session information associated with a second request for content received from the user device, the second session information including the first identifier;
determine that the first identifier is associated with the second identifier;
modify the second request for content by inserting the second identifier into the second request for content;
provide the modified second request for content to the content provider to obtain additional targeted content; and
provide the additional targeted content to the user device.

14. The device of claim 8, where the first identifier includes information associated with a subscriber associated with the user device.

15. A non-transitory computer-readable medium storing instructions, the instructions comprising:
one or more instructions that, when executed by a processor of a device, cause the processor to:
obtain session information associated with a session via which a request for content is received from a user device,
the session information identifying a first identifier associated with the user device;
generate a second identifier based on the first identifier;
insert the second identifier into the request;
provide the request, including the second identifier, to a content provider to obtain targeted content from the content provider,
the targeted content being associated with the second identifier and conforming to an attribute associated with the user device; and
provide the targeted content to the user device.

16. The non-transitory computer-readable medium of claim 15, where the one or more instructions to generate the second identifier include:
one or more instructions that, when executed by the processor, cause the processor to:
generate the second identifier based on the first identifier and a key,
the key being generated based on a random value.

17. The non-transitory computer-readable medium of claim 15, where the one or more instructions to generate the second identifier include:
one or more instructions that, when executed by the processor, cause the processor to:
determine that a subscriber, associated with the user device, authorizes a use of a profile, associated with the subscriber, to obtain the targeted content; and
where the one or more instructions to generate the second identifier include:
one or more instructions that, when executed by the processor, cause the processor to:
generate the second identifier based on the subscriber authorizing the user of the subscriber profile to obtain the targeted content.

18. The non-transitory computer-readable medium of claim 15, where the one or more instructions to generate the second identifier include:
one or more instructions that, when executed by the processor, cause the processor to:
generate the second identifier based on a cryptographic hash function.

19. The non-transitory computer-readable medium of claim 15, where the attribute associated with the user device comprises a first attribute, the instructions further comprising:
one or more instructions that, when executed by the processor, cause the processor to:
receive, from the content provider, a request to authenticate a subscriber,
the request to authenticate the subscriber including the second identifier and a second attribute,
the second attribute being received, from the user device, by the content provider;
determine that the second identifier is associated with the first identifier;
obtain a subscriber profile associated with the first identifier,
the subscriber profile including information identifying the first attribute; and
provide, to the content provider, information indicating that the subscriber is authenticated when the first attribute matches the second attribute.

20. The non-transitory computer-readable medium of claim 15, where the instructions further comprise:
one or more instructions that, when executed by the processor, cause the processor to:
associate the second identifier with the first identifier;
receive another request for content,
the other request including the first identifier;
determine that the first identifier is associated with the second identifier;
determine that the second identifier has expired based on a time at which the other request is received not being within a period of time for which the second identifier is valid;
generate a third identifier based on the first identifier and another key;
provide the other request and the third identifier to the content provider to obtain other targeted content; and
provide the other targeted content to the user device.

* * * * *